United States Patent [19]

Nishimura et al.

[11] Patent Number: 4,611,286

[45] Date of Patent: Sep. 9, 1986

[54] CASH ACCOUNTING SYSTEM

[75] Inventors: Katsuji Nishimura, Habikino; Hachizou Yamamoto, Nara, both of Japan

[73] Assignee: Sharp Kabushiki Kaisha, Osaka, Japan

[21] Appl. No.: 757,203

[22] Filed: Jul. 22, 1985

Related U.S. Application Data

[63] Continuation of Ser. No. 460,298, Jan. 24, 1983, abandoned.

[30] Foreign Application Priority Data

Jan. 30, 1982 [JP] Japan .................................. 57-14035
Feb. 10, 1982 [JP] Japan .................................. 57-20323
Feb. 10, 1982 [JP] Japan .................................. 57-20324

[51] Int. Cl.[4] .............................................. G06F 15/30
[52] U.S. Cl. ..................................... 364/405; 364/406; 235/379
[58] Field of Search ................................. 364/400–401, 364/404–406, 408; 235/379, 381, 385, 375, 380

[56] References Cited

U.S. PATENT DOCUMENTS

| 3,760,158 | 9/1973 | Whitehead et al. | 235/379 |
|---|---|---|---|
| 4,001,568 | 1/1977 | Iizuka et al. | 235/379 |
| 4,166,945 | 9/1979 | Inoyama et al. | 235/379 |
| 4,282,424 | 8/1981 | Hirose | 235/379 |
| 4,319,326 | 3/1982 | Uchida | 364/405 |
| 4,321,672 | 3/1982 | Braun et al. | 364/408 |
| 4,322,796 | 3/1982 | Uchida et al. | 364/405 |
| 4,390,968 | 6/1983 | Hennessy et al. | 364/408 X |
| 4,423,316 | 12/1983 | Sano et al. | 235/379 |
| 4,443,692 | 4/1984 | Nishimura | 235/379 |

FOREIGN PATENT DOCUMENTS 2097163 3/1982 United Kingdom ................ 235/381

Primary Examiner—Gary V. Harkcom
Attorney, Agent, or Firm—Birch, Stewart, Kolasch & Birch

[57] ABSTRACT

A cash accounting system which includes a cash register for registering transactions of money and a cash dispenser coupled with the cash register for dispensing an amount of money required to be paid out during the respective transactions. Each of the cash register and the cash dispenser includes a memory. The memory in the cash register is used to memorize the current stock of money of different denominations which can be manually paid out, whereas the memory in the cash dispenser is used to memorize the current stock of money of different denomination which can be paid out through the cash dispenser.

1 Claim, 13 Drawing Figures

CASH ACCOUNTING SYSTEM

This application is a continuation of application Ser. No. 460,298 filed on Jan. 24, 1983, now abandoned.

BACKGROUND OF THE INVENTION

The present invention generally relates to a cash accounting system and, more particularly, to a cash accounting system of a type wherein a cash register to be used in a bank for the registration of transactions and a cash dispenser for dispensing or paying out an amount of money, such as papers and/or coins, required as a result of each transaction are electricaly connected together.

According to the prior art, the amount and the type, i.e., denomination, of money recovered are separately stored in the cash register and the cash dispenser by an operator according to the disposable denomination and money according to the denomination and money to be dispensed by the cash dispenser. This sorting operation performed by the operator is susceptible to error during the calculation and/or during the input operation, while any countermeasures has long been neglected.

The prior art accounting system is shown in FIG. 1 of the accompanying drawings and generaly comprises a cash register I and a cash dispenser II.

As shown in FIG. 1, the cash register I includes a mode selector switch 1, a mode information memory 2, a numerical keyboard 3, a function keyboard 4, a keyboard input detector 5, a central processing unit (CPU) 6, a read-only memory (ROM) 7, an interlocking switch 8, a keyboard input discriminator 10, a secondary address counter 11, a secondary memory 12, a secondary input and output control 13, a primary address counter 14, a primary memory 15, a primary input and output control 16, a printer unit 17, a display unit 18 and a data transfer control 19. The primary memory 15 is adapted to store the amount of money transacted according to the denomination.

On the other hand, the cash dispenser II comprises a data transfer control 20, a pay-out control 21, a pay-out drive unit 22, a storage unit 23, a pay-out counter 24, a tray 25 and a pay-out completion detector 26.

The prior art system of the above described construction is selectively operable under setting and registering modes, one at a time, these modes being hereinafter described separately.

Referring to FIG. 2 which illustrates a flow chart of the program of operation under the setting mode, the operator, when he or she wishes to utilize the cash accounting system must set in the cash register I various data necessary to register the particular transaction in the following manner.

In the first place, the mode selector switch 1 must be set to the setting mode to cause the mode information memory 2 to store the mode information. When the operator subsequently depresses a key in one of the numerical keyboard 3 and the function keyboard 4 in order to enter the setting data, the keyboard input detector 5 is activated to cause the mode information to be supplied to and stored in an area a of the CPU 6. When and after the mode information is so stored in the area a of the CPU 6, the CPU 6 handles the data to be subsequently entered as setting data, which data are thereafter processed according to a predetermined program stored in the ROM 7.

Then, in order to determine whether the cash register I is to be interlocked with the cash dispenser II, the interlock switch 8 is manipulated to set at an area b of the CPU 6 a flag indicative of the interlocking of the cash register I with the cash dispenser II.

Thereafter, in order to enter, according to the denomination, the total of the current balance of money in the cash register I and the stock of money in the cash dispenser II, money information is supplied from the numerical keyboard 3 to the CPU 6 through the keyboard input encoder 9 and, subsequently, by the utilization of one of the denomination keys t in the function keyboard 4, instruction specifying the information which has been previously entered according to the denomination is given to the CPU 6 through the keyboard input discriminator 10. The CPU 6 upon receipt of this instruction causes various amounts of money according to the different denimonation to be stored through the input and output control 13 at a denomination area of the secondary memory 12 specified by the secondary address counter 11. On the other hand, although the operator sets the data necessary to register the transaction, the setting of such necessary data is not itself the subject matter of the present invention and the details thereof are herein omitted.

Referring now to FIG. 3, which illustrates a flow chart of the program of operation under the registering mode, it is assumed that the setting of the various data has been completed by the manipulation in the manner described hereinabove and a registration of a transaction is brought about. The operator has to set the selector switch 1 to a registering mode, in a manner similar to the above described procedure, to cause registering mode information to be stored at the area a in the CPU 6. The CPU 6, upon receipt of the registering mode information, deals with the data to be subsequently entered as registering data, which data are thereafter processed according to a predetermined registering program stored in the ROM 7.

More specificaly, by depressing one of the item specifying keys I to N in the function keyboard 4 information concerning which one of the ordinary deposit and the current deposit the particular transaction relates to is entered, and the specification of the item is instructed to the CPU 6 through the discriminator 10. Subsequently, the operator enters the total amount of money transacted into the CPU6 from the numerical keyboard 3 through the encoder 9 and then depresses a pay instruction key in the function keyboard 4 to indicate that the money information which has previously been fed to the CPU 6 through the discriminator 10 is concerned with the process to pay money.

The CPU 6 upon receipt of this instruction, causes the amount of money to be paid to be stored at a pay-out money area of the primary memory 15, specified by the primary address counter 14, through the primary input and output control 16. At the same time, this information can be printed out from the printer 17 and displayed through the display unit 18.

Subsequently, in order to specify the amount of money to be paid out according to the different denominations, the operator manipulates the numerical keyboard 3 to feed the money information to the CPU 6 through the encoder 9 and also manipulates one of the denomination specifying keys t in the function keyboard 4 to instruct the CPU 6 through the discriminator 10 as to the amount of money according to the diferent denomination. The CPU 6 upon receipt of this instruction causes it to be stored at a predetermined area of the primary memory 15 specified by the primary address counter 14, through the primary input and output control 16. Simulatneously therewith, these data are printed out through the printer 17.

Furthermore, the CPU 6 determines the presence or absence of the flag in the area b, and then determines whether or not the cash dispenser II is interlocked. In this case, since the cash dispenser II is interlocked, the CPU 6 determines whether or not the amount of money of different denomination, which is entered, can be paid out through the cash dispenser. If the amount of money of different denomination can be paid out through the cash dispenser, the CPU 6 upon completion of the data of money of different denomination gives an instruction to pay to the cash dispenser through the data transfer control 19.

When this instruction is received by the cash dispenser II through the data transfer control 20, the money stored in the storage unit 23 is dispensed by the drive unit 22 under the control of the pay-out control unit 20 to dispense the money onto the tray 25. Money to be dispensed is counted by the pay-out counter unit 24 and a count signal from the counter unit 24 is supplied to the pay-out completion detector 26. When the pay-out of the money of different denomination has been completed, the detector 26 generates a pay-out completion signal to the pay-out control unit 21.

When the pay-out of the money of different denominations has completely been finished in the manner as hereinabove described, the pay-out control unit 21 transfers a pay-out completion command to the cash register I through the data transfer control unit 20.

The CPU 6, upon receipt of this command, determines whether or not the amount of money to be paid out which has prevously been entered coincides with the amount of money actually paid out, and if they coincide with each other, the amount of money actually paid out is substracted from the current stock of different denominations stored in the secondary memory 12.

In this way, the registration of the transaction is completed, and the necessary data in the primary memory 15 are transfered to and stored in the secondary memory 12 while a printed record is issued from the printer unit 17 and the contents of the primary memory 15 are completely cleared in readiness for the next succeeding registration of a transaction.

The foregoing description applies where the cash dispenser II is interlocked with the cash register I. However, where it is not interlocked, at the time of completion of the entry of the money data according to different denomination, the operator, by the manipulation of a verifying key A in the function keyboard 4, has to give to the CPU 6 an instruction to verify so that a check can be made as to whether or not the amount of money to be paid out which has previously been entered coincides with the amount of money of all denominations.

Upon receipt of this instruction, the CPU 6 functions, if they are found coinciding, in such a manner as to cause the amount of money actually paid out to be subtracted from the current stock of money of different denomination and as to cause the data stored in the primary memory 15 to be transferred to the secondary memory 12 while a printed record is issued through the printer unit 17 and the contents of the primary memory 15 is cleared in readiness for the next succeeding registration of transaction.

As hereinbefore described, the prior art cash accounting system is such that the cash dispenser II serves only to pay out the money in response to a command from the cash register I and to generate a completion confirming signal whereas the printer unit 17 in the cash register I merely serves to issue a printed record based on information within the domain of the cash register I.

In addition, as shown in FIG. 4(a), the prior art cash accounting system is such that one cash register I is usualy coupled with one cash dispenser II while it is generally considered desirable that, as shown in FIG. 4(b), two cash registers IA and IB can concurrently utilize one cash dispenser II. If two cash registers are merely interlocked with the cash dispenser, the system will fail to perform an accurate management of the current stock of money in that system.

SUMMARY OF THE INVENTION

Accordingly, the present invention has been developed with a view to substantially eliminating the above described disadvantages and inconveniences inherent in the prior art system and has for its essential object to provide an improved cash accounting system wherein, when the cash register and the cash dispenser are interlocked with each other, a check list including the stock of money of different denomination in the cash dispenser can be issued in association with the verifying operation of the cash register.

Another object of the present invention is to provide an improved cash accounting system wherein a sale cash dispenser can be coupled with a plurality of cash registers without adversely affecting the accurate management of the stock of money in the system as a whole.

A further object of the present invention is to provide an improved cash accounting system which is easy to operate with the possibility of the occurrence of errors minimized, since while the operator causes the current stock of money of different denomination to be stored in a first memory means, the amount of money of different denomination to be paid out is subtracted from the information stored in the first memory means when the amount of money of different denomination to be paid out is entered.

BRIEF DESCRIPTION OF THE DRAWINGS

These and other objects and features of the present invention will become clear from the following detailed description taken in conjunction with preferred embodiments thereof with reference to the accompanying drawings, in which.

DETAILED DESCRIPTION OF THE EMBODIMENTS

Figure 1:
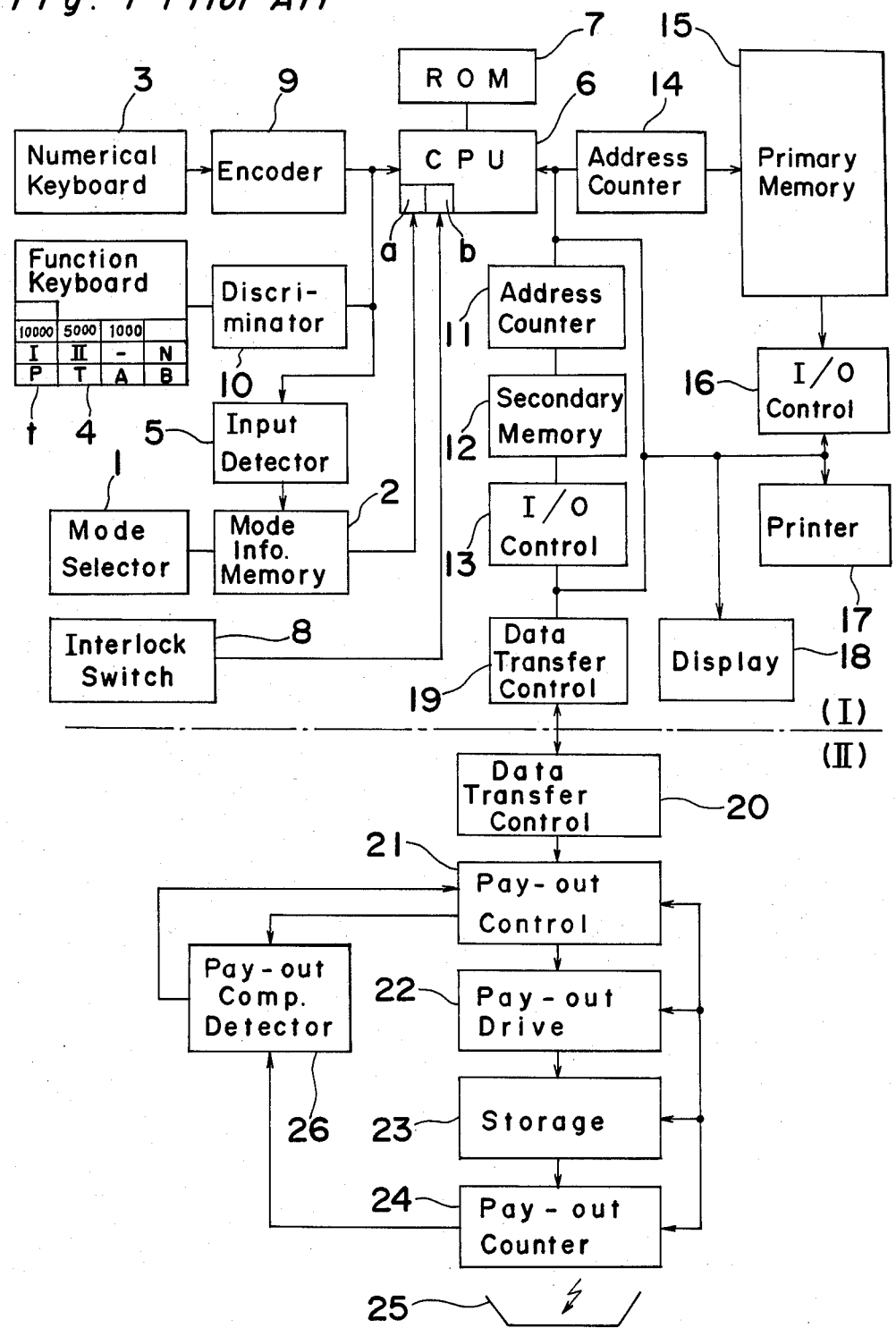
FIG. 1 is a circuit block diagram showing the prior art cash accounting system.

Before the description of the present invention proceeds, it is to be noted that like parts are designated by like reference numerals throughout the accompanying drawings. It is also to be noted that, for the sake of brevity, only differences between the present invention and the prior art system shown in FIG. 1 will be described so far as the structure is concerned.

Figure 5:
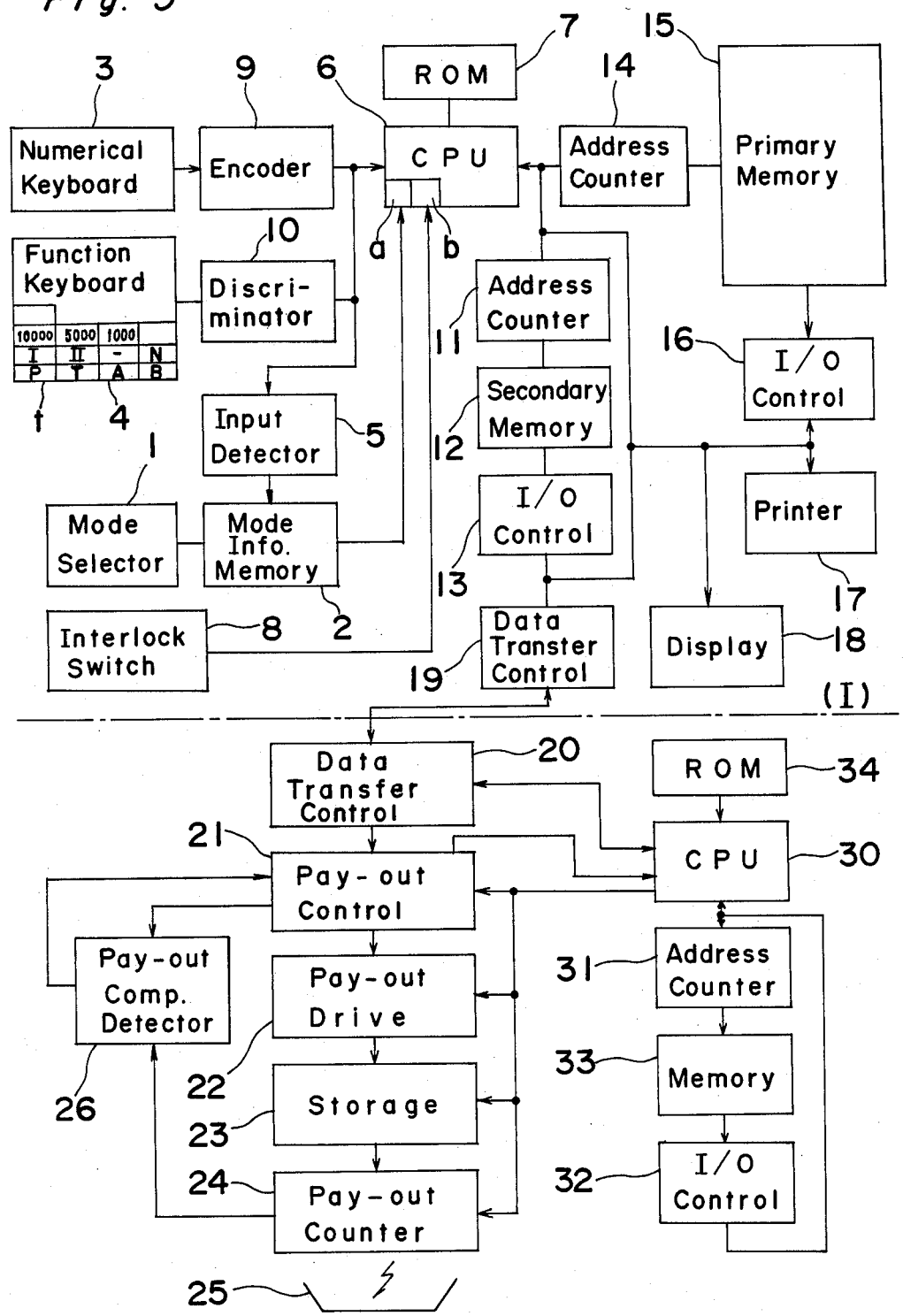
FIG. 5 is a circuit block diagram showing a cash accounting system according to a preferred embodiment of the present invention.

Referrring now to FIG. 5, as is the case with the prior art system shown in FIG. 1, the cash accounting system shown therein comprises a cash register I of a construction identical with that shown in FIG. 1 and a cash dispenser II of a construction which comprises, in addition to the numerous elements 20 to 26 shown in FIG. 1, a central processing unit (CPU) 30, an address counter 31, an input and output control 32, a third address counter 32, a third memory 33, and a read-only memory (ROM) 34. It is to be noted that the program stored in the ROM 34 is different from that in the ROM 7 of the cash register II.

Figure 6:
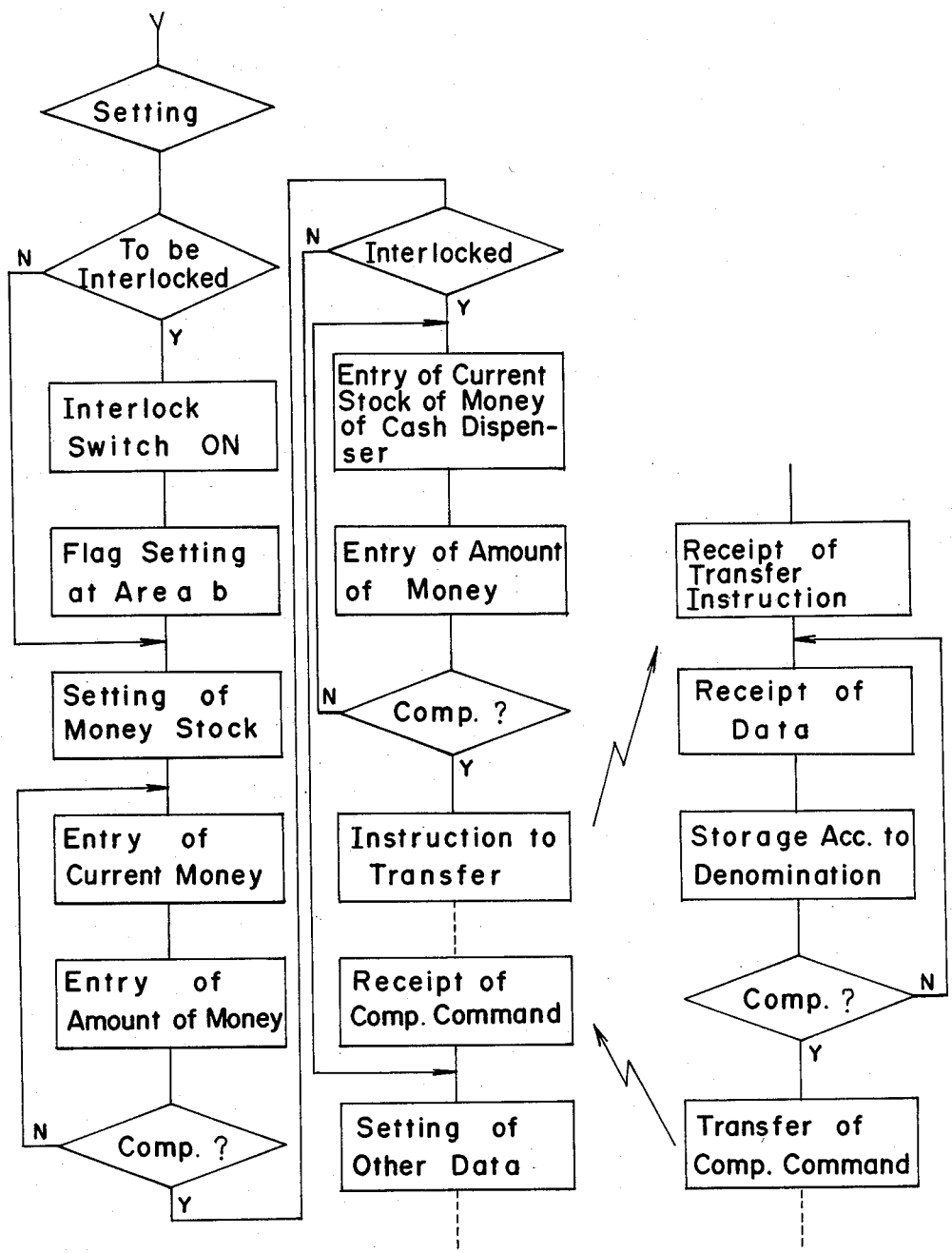
FIG. 6 is a flow chart showing a program of operation of the system of FIG. 5 under a setting mode.

The operation of the system of FIG. 5 under the various data setting mode will now be described with reference to FIG. 6.

Figure 2:
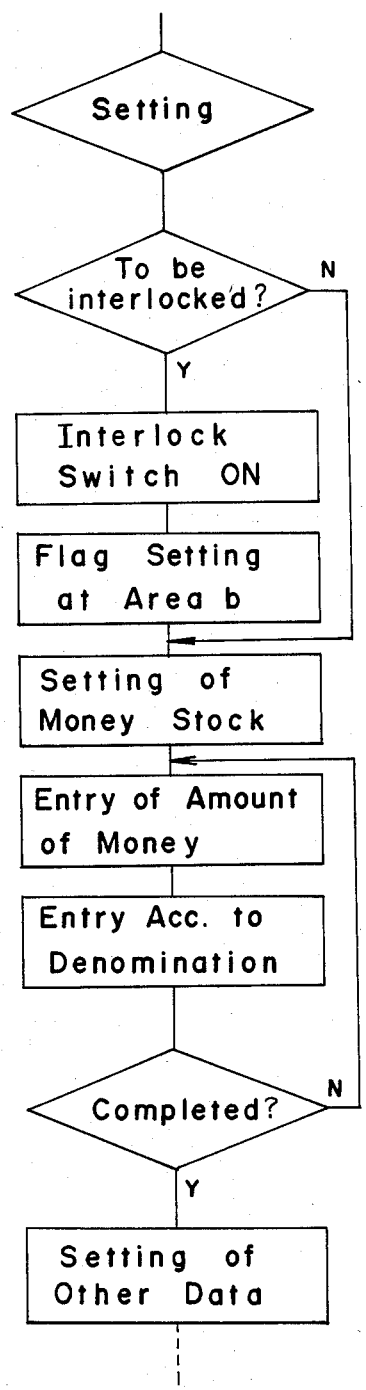
FIG. 2 is a flow chart showing the program of operation of the prior art system under a setting mode.
Figure 4A:
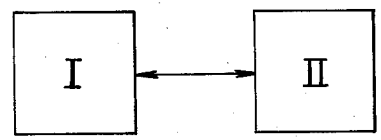
FIG. 4(a) is a diagram showing the connection between a cash register and a dispenser in the prior art system.
Figure 4B:
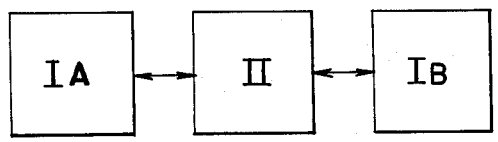
FIG. 4(b) is a diagram showing a desired connection between one cash dispenser and a plurality of cash registers.
Figure 3:
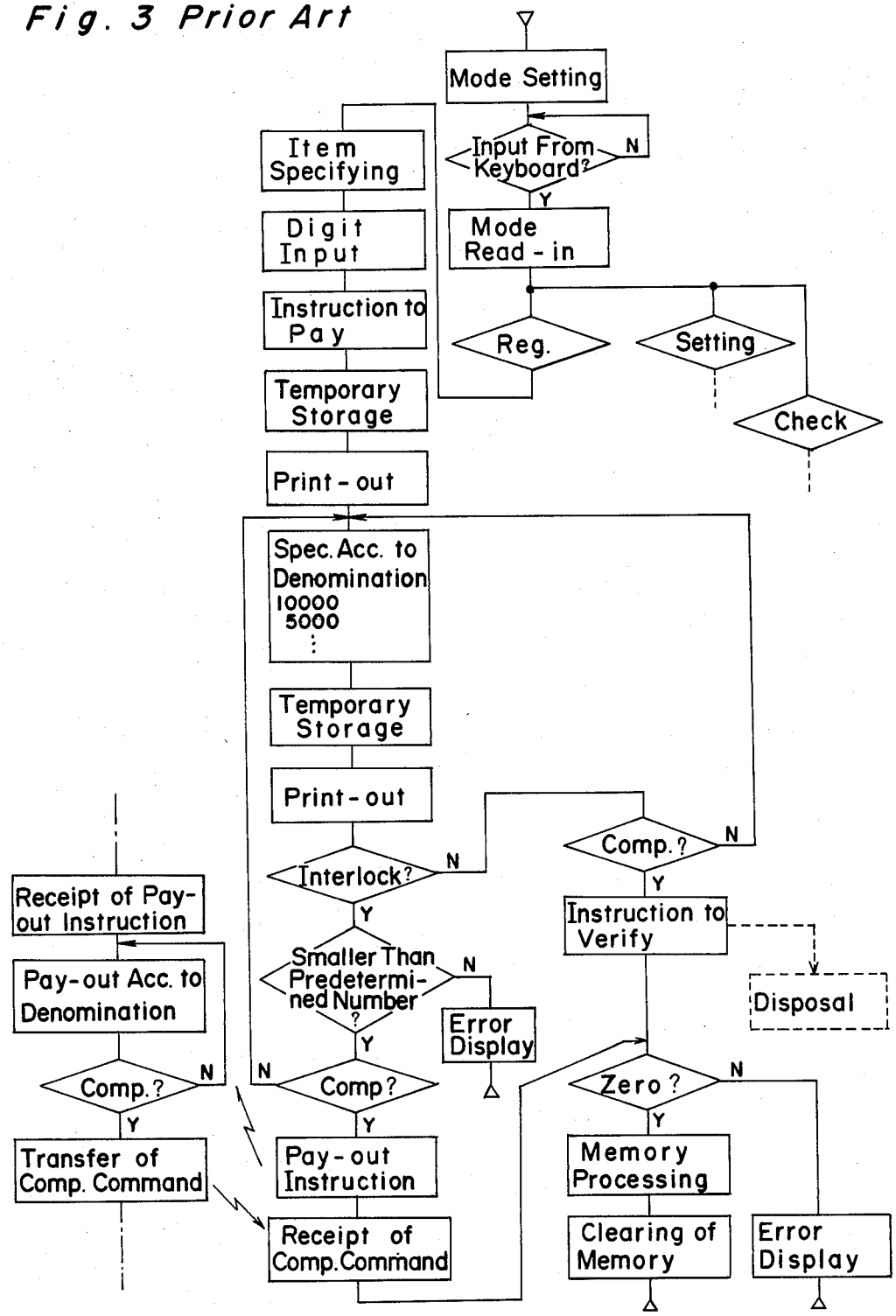
FIG. 3 is a flow chart similar to FIG. 2, but under a registering mode.

In a manner similar to that described with reference to FIG. 2, the operator manipulates the mode selector switch 1 to set the system in the setting mode with the mode information consequently stored at the area a of the CPU 6 and to specify a setting program in the ROM 7. In addition, the interlocking switch 8 is selected to an interlocking position to set at the area b of the CPU 6 a flag indicating that the cash register I has been interlocked with the cash dispenser II.

Subsequently, in order to enter the current stock of money to be dispensed, the operator manipulates the numerical keyboard 3 to cause an output from the keyboard 3 to be supplied to the CPU 6 through the encoder 9 and then manipulates one of the denomination specifying keys t in the function keyboard 4 to cause an output from the keyboard 4 to be fed to the CPU 6 through the discriminator 10 to specify the denomination of the money data previously entered. Upon receipt of the instruction, the CPU 6 causes the current stock of money of different denomination to be stored in a predetermined area in the secondary memory 12, specified by the secondary address counter 11, through the secondary input and output control 13 as shown in FIG. 6.

When the setting of the data of the amount of money to be disposed has been completed, the operator manipulates the numerical keyboard 3 to enter the money of different denomination to be successively dispensed from the cash dispenser II while utilizing the denomination specifying keys t to cause the data of particular denominations to be fed to the CPU 6.

When the current stock of money of different denomination in the cash dispenser has been entered in the CPU 6, the operator then depresses a data transfer instructing key B in the function keyboard 4 to instruct the CPU 6 that the data of the denomination previously entered in the CPU 6 be transferred. Upon receipt of this instruction, the CPU 6 transfers the denomination data to the cash dispenser II through the data transfer control 19.

The data so transfered to the cash dispenser II through the data transfer control 19 is received by the CPU 30 through the data transfer control 20. Upon receipt of this data, the CPU 30 causes the current stock of money of different denomination to be stored at a predetermined area in the third memory 33, specified by the address counter 31, through the input and output control 32 as shown in FIG. 6.

When the storage of the current stock of money of different denomination on the side of the cash dispenser II has been completed in the manner described above, the CPU 30 transfers to the cash register I a completion command indicative of the completion of the data storage. When this command is received by the CPU 6, the CPU 6 terminates the setting of the stock of money of different denomination and starts setting of other data.

The operation of the system of FIG. 5 under a transaction registering mode will now be described with reference to FIG. 7.

If the setting of the various information has been completed in the manner as hereinabove described and a registration of a new transaction is brought about, the operator has to set the selector switch 1 to a registering mode, in a manner similar to the above described procedure, to cause a registering mode information to be stored at the area a in the CPU 6. The CPU 6, upon receipt of the registering mode information, deals with the data to be subsequently entered as registering data, which data are thereafter processed according to a predetermined registering program stored in the ROM 7.

More specificaly, by depressing one of the item specifying keys I to N in the function keyboard 4, information is entered concerning which one of the ordinary deposit and the current deposit the particular transaction relates to, and the specification of the item is instructed to the CPU 6 through the discriminator 10. Subsequently, the operator enters the total amount of money transacted into the CPU 6 from the numerical keyboard 3 through the encoder 9 and then depresses a pay instruction key in the function keyboard 4 to indicate that the money information which has previously been fed to the CPU 6 through the discriminator 10 is concerned with the process to pay money.

The CPU 6 upon receipt of this instruction, causes the amount of money to be paid to be stored at a pay-out money area of the primary memory 15, specified by the primary address counter 14, through the primary input and output control 16. At the same time, this information can be printed out from the printer 17 and displayed through the display unit 18.

Subsequently, in order to specify the amount of money to be paid out according to the different denomination, the operator manipulates the numerical keyboard 3 to feed the money information to the CPU 6 through the encoder 9 and also manipulates one of the denomination specifying keys t in the function keyboard 4 to instruct the CPU 6 through the discriminator 10 as to the amount of money according to the different denomination. The CPU 6 upon receipt of this instruction causes it to be stored at a predetermined area of the primary memory 15, specified by the address counter 14, through the primary input and output control 16. Simultaneously therewith, these data are printed out through the printer 17.

At this time, the CPU 6 makes reference to the area b to determine whether or not the cash dispenser II is interlocked with the cash register I and, if they are interlocked, to determine whether or not the amount of money can be paid in the designated denominations specified by the data and such amount of money of designated denominations. If it has found not payable, a display to warn the operator that the amount of money cannot be payable in the designated denominations is effected.

On the other hand, if it has been determined payable, and when the data of all of the denominations is supplied, the operator has to give a pay-out instruction to the CPU 6 by depressing a pay-out instructing key T in the function keyboard 4. In response to this instruction, the CPU 6 gives a pay-out instruction together with the data of the amount of money of different denomination to the cash dispenser II through the data transfer control 19.

When the CPU 30 has received both of the pay-out instruction and the denomination data through the data transfer control 20 in the cash dispenser II, the CPU 30 controls the pay-out control unit 21 in accordance with the program stored in the ROM 34 and causes the drive unit 22 to activate the storage unit 23 to dispense the required amount of money onto the tray 25. At this time, the required amount of money is counted by the pay-out counter 24, and after the pay-out completion detector 26 has confirmed the pay-out of the required amount of money in response to an output signal from the counter 24, a pay-out completion signal is supplied therefrom to the pay-out control unit 21. Thereafter, in response to the pay-out completion signal, the pay-out control unit 21 gives a pay-out completion signal to the CPU 30.

Figure 7:
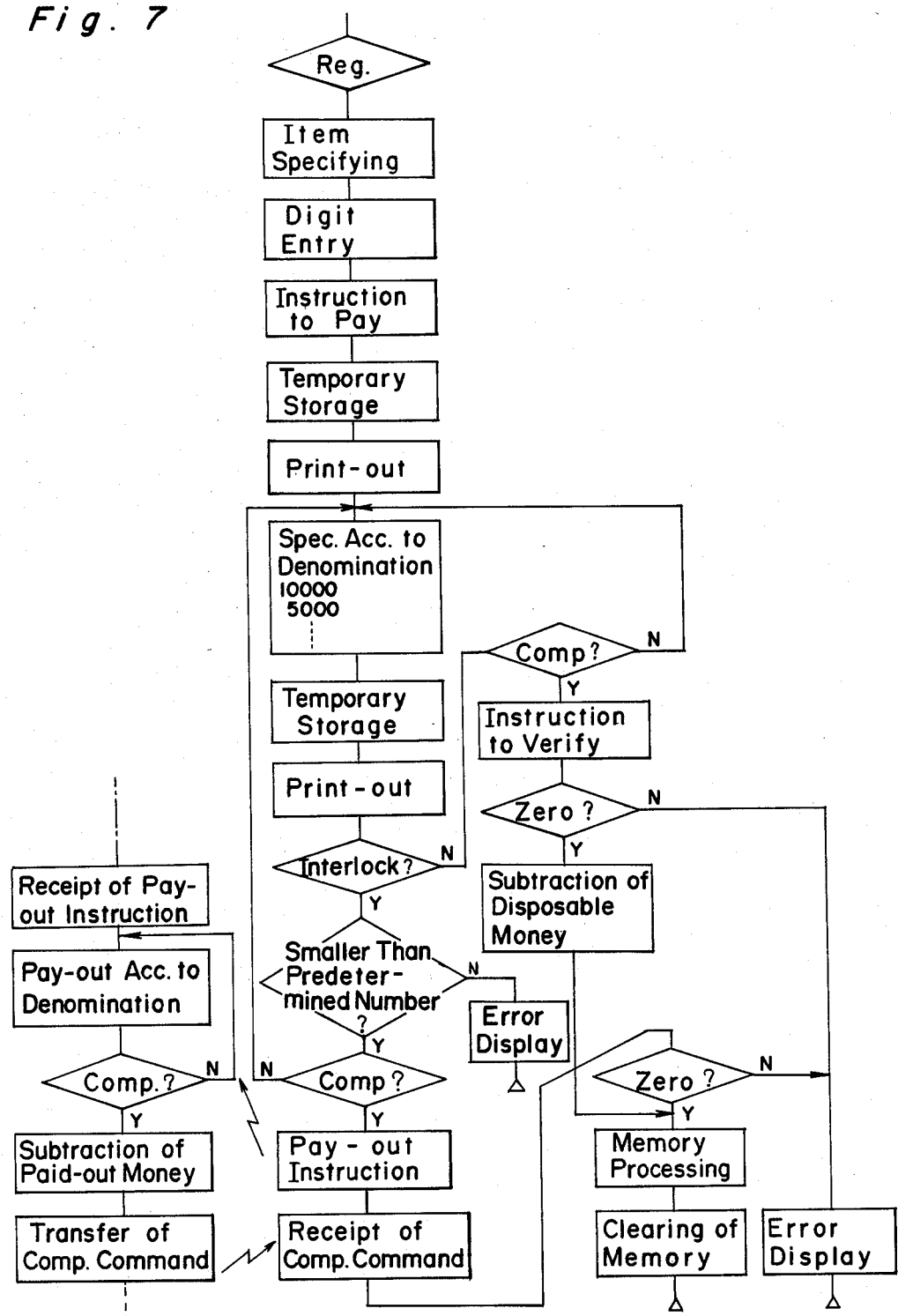
FIG. 7 is a flow chart similar to FIG. 6, but under a registering mode.

When the pay-out of the money of different denomination has completely been finished in the manner as described hereinabove, the CPU 30 subtracts the actually paid amount of money from the denomination data stored in the third memory 33 as shown in FIG. 7. Subsequently, the CPU transfers a pay-out completion command to the cash register I through the data transfer control 20.

The CPU 6, upon receipt of this command, determines whether or not the amount of money to be paid out which as previously been entered coincides with the amount of money actually paid out, and if they coincide with each other, the current stock of different denomination stored in the secondary memory 12 is reduced by the amount of the money actually paid out. In this way, the registration of the particular transaction is completed, and the necessary data in the primary memory 15 are transferred to and stored in the secondary memory 12 while a printed record is issued from the printer 17 and the contents of the primary memory 15 are completely cleared in readiness for the next succeeding registration of a transaction.

The foregoing descriptrion applies where the cash dispenser II is interlocked with the cash register I. However, where it is not interlocked, at the time of completion of the entry of the money data specifying different denominations, the operator, by the manipulation of the verifying key A in the function keyboard 4, has to give to the CPU 6 an instruction to verify so that a check can be made as to whether or not the amount of money to be paid out which has previously been entered coincides with the amount of money of different denomination as shown in FIG. 7.

Upon receipt of this instruction, the CPU 6 functions, if they are found to be coincident, in such a manner as to cause the amount of money stored in the primary memory 15 to be subtracted from the amount of money of different denomination stored in the secondary memory 12 as shown in FIG. 7. Subsequently, the CPU 6 causes the various data stored in the primary memory 15 to be acumulated in the secondary memory 12 and then clears the contents in the primary memory 15 in readiness for the next succeeding registration of transaction.

From the foregoing, it has now become clear that since the system includes memory means in the cash register I and the cash dispenser II, respectively, for memorizing the current stock of money of different denomination to be disposed of by the operator or the cash dispenser while the amount of money actually disposed of can be processed by the respective memory means, it is possible to couple a plurality of the cash register to a sale cash dispenser without adversely affecting an accurate management of the current stock of money. Moreover, since the storage of the denomination data in the cash dispenser is carried out by transfering the corresponding data from the cash register, the system of the above described construction is useful in practical application.

Another preferred embodiment of the present invention will now be described with reference to FIGS. 8 to 11.

Figure 8:
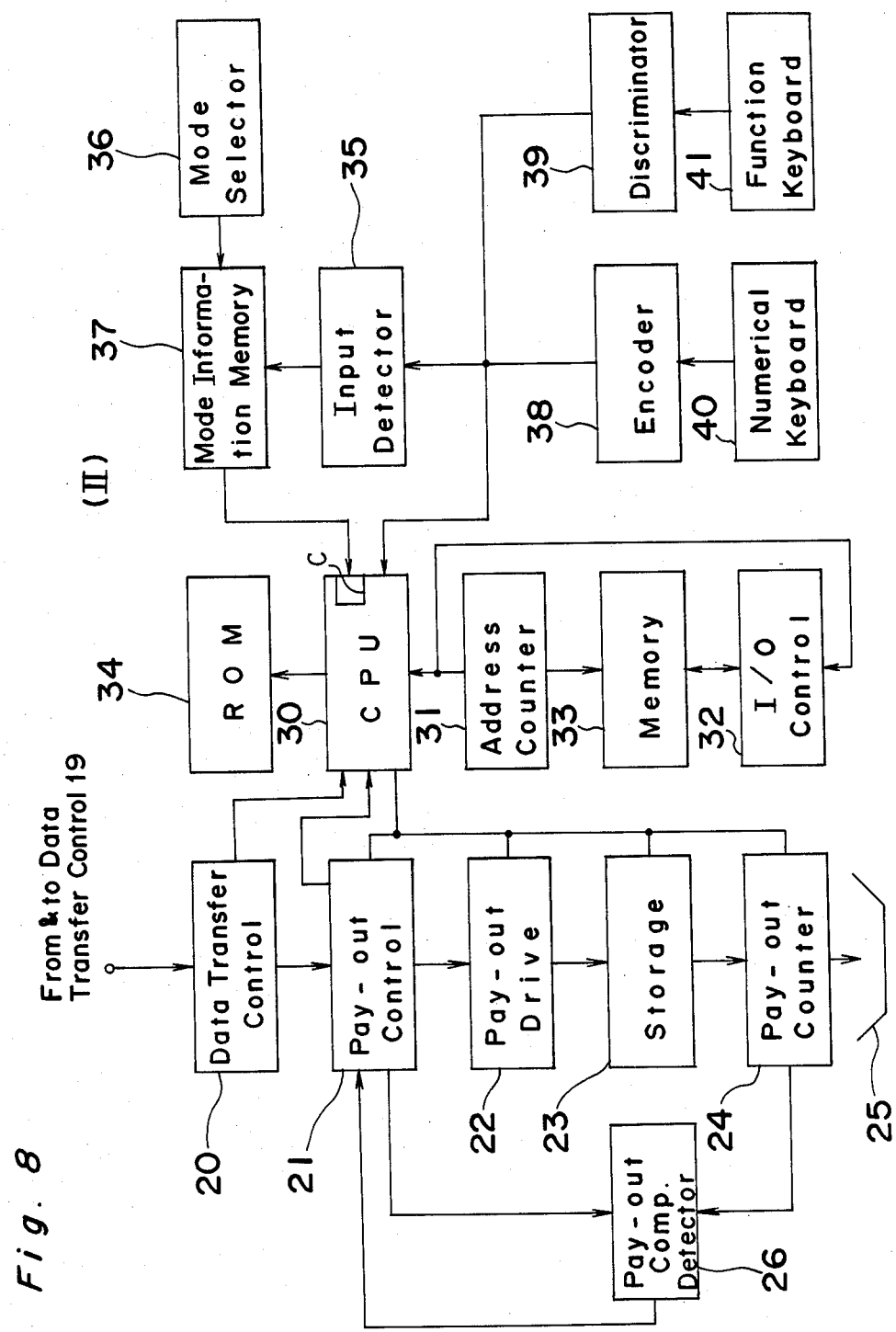
FIG. 8 is a circuit diagram showing only the cash dispenser according to another preferred embodiment of the present invention.

The system according to the second preferred embodiment of the present invention differs in the construction of the cash dispenser from that according to the foregoing preferred embodiment particularly shown in FIG. 5. As best shown in FIG. 8, the cash dispenser II shown therein comprises, in addition to the elements 20 to 26 and 30 to 34 shown in FIG. 5, a mode selector switch 36, a mode information memory 37, a numerical keyboard 40, a function keyboard 41, a keyboard input detector 35, an keyboard input encoder 38 and a keyboard input discriminator 39.

Figure 10A:
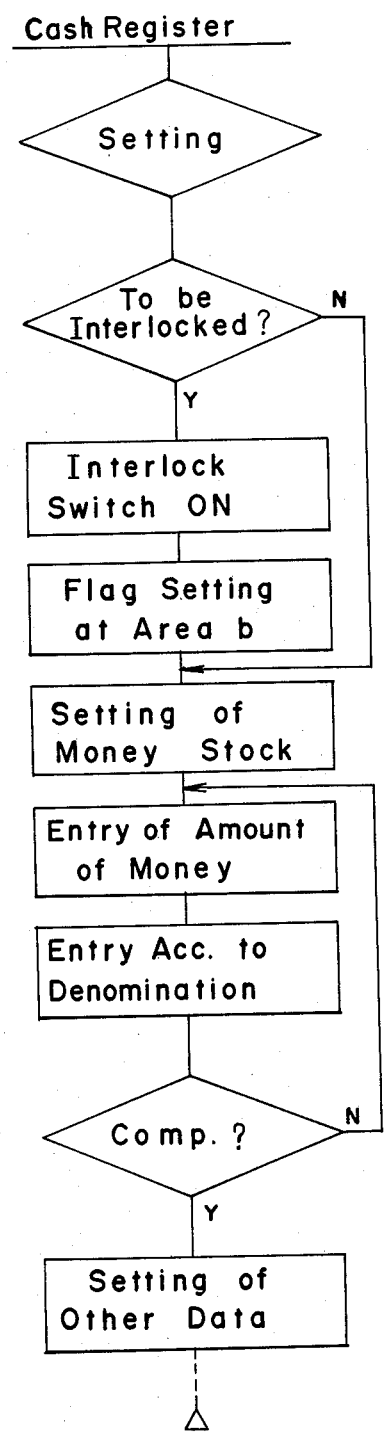
FIG. 10(a) is a flow chart showing a program stored in a read-only memory in the cash dispenser used in the system of FIG. 8.

The operation of the system according to the second preferred embodiment of the present invention under the data setting mode will now be described with reference to the flow chart shown in FIG. 10(a).

In the first place, the mode selector switch 1 is set to a setting mode position. Once the setting mode has been selected, this setting mode information is temporarily stored in the mode information memory 2. Subsequently, in order to enter various data, the operator manipulates a key in the numerical keyboard 3 or the function keyboard 4 with the keyboard input detector 5 consequently activated to permit the mode information stored in the memory 2 to be fed to the area a of the CPU 6.

When the setting mode information is so entered in the area a of the CPU 6, the CPU 6 thereafter handles the subsequently entered inputs in accordance with a setting data processing program (See FIG. 11) stored in the ROM 7.

Specifically, in order to determine whether or not the cash register I is interlocked with the cash dispenser II, the interlocking switch 8 is selectively set. Since the present invention is directed to the system operable under the condition in which the cash register is interlocked with the cash dispenser, only the case in which the interlocking switch 8 is turned on will be discussed.

When this switch 8 is turned on, a flag is set in the RAM area b of the CPU 6 to indicate that the cash register I is interlocked with the cash dispenser II. Subsequently, the operator registers the current stock of money before the transaction is registered. More specifically, in order to enter the current stock of money, the operator manipulates the numerical keyboard 3 to cause an output from the keyboard 3 to be supplied to the CPU 6 through the encoder 9 and then manipulates one of the denomination specifying keys t in the function keyboard 4 to cause an output from the keyboard 4 to be fed to the CPU 6 through the discriminator 10 to specify the denomination of the money data previously entered. Upon receipt of the instruction, the CPU 6 causes the current stock of money of different denomination to be stored in a predetermined area in the secondary memory 12, specified by the secondary address counter 11, through the secondary input and output control 13.

Figure 10B:
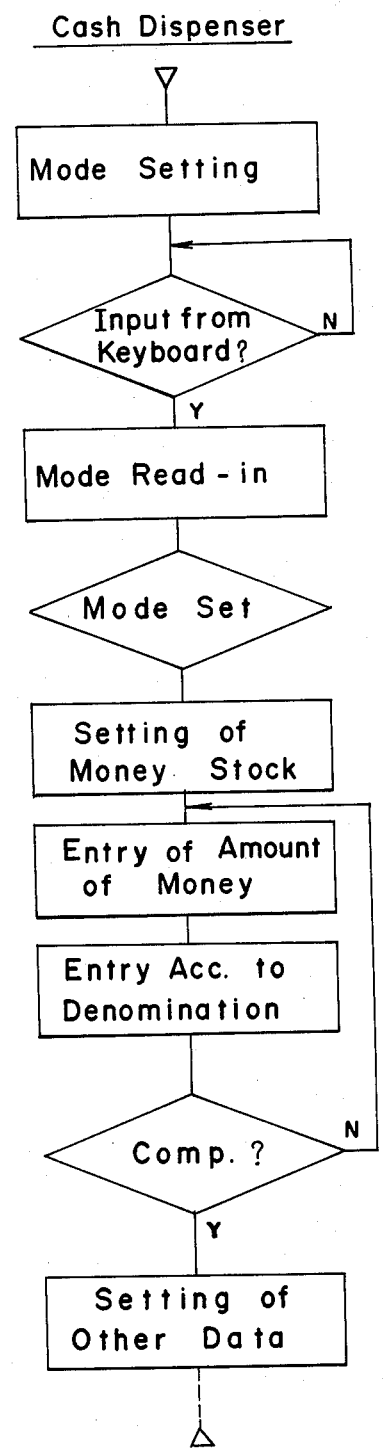
FIG. 10(b) is a flow chart similar to FIG. 10(a), but showing a program stored in a read-only memory in the cash dispenser shown in FIG. 8.

Hereinafter, the data setting to the cash dispenser will now be described with particular reference to FIGS. 8 and 10(b).

In the first place, the mode selector switch 36 in the cash dispenser II is set to a setting mode position with the setting mode information consequently stored in the mode information memory 37 temporarily. Thereupon, the operator manipulates a key in the numerical keyboard 40 or the function keyboard 41 with the keyboard input detector 35 consequently activated to permit the mode information stored in the memory 37 to be fed to an area c of the CPU 30.

When the setting mode information is so entered in the area c of the CPU 30, the CPU 30 thereafter handles the subsequently entered inputs in accordance with a setting data processing program (See FIG. 10(b)).

Thereafter, various data are specifically set.

For this purpose, when it is desired to set the current stock of money of different denomination, the operator manipulates the numerical keyboard 40 so that money information can be supplied to the CPU 30 through the keyboard input encoder 38. Then, the operator manipulates a denomination specifying key in the function keyboard 41 so that an instruction can be given to the CPU 30 through the keyboard input discriminator 39 to specify which denomination the money information previously entered belongs to.

In response to the instruction, the CPU 30 causes the data of the money of different denomination to be stored at a predetermined area of the third memory 33, specified by the address counter 31, through the input and output control 32. In a manner similar to that described above, the operator causes the various data to be stored in the memory 33.

Figure 9:
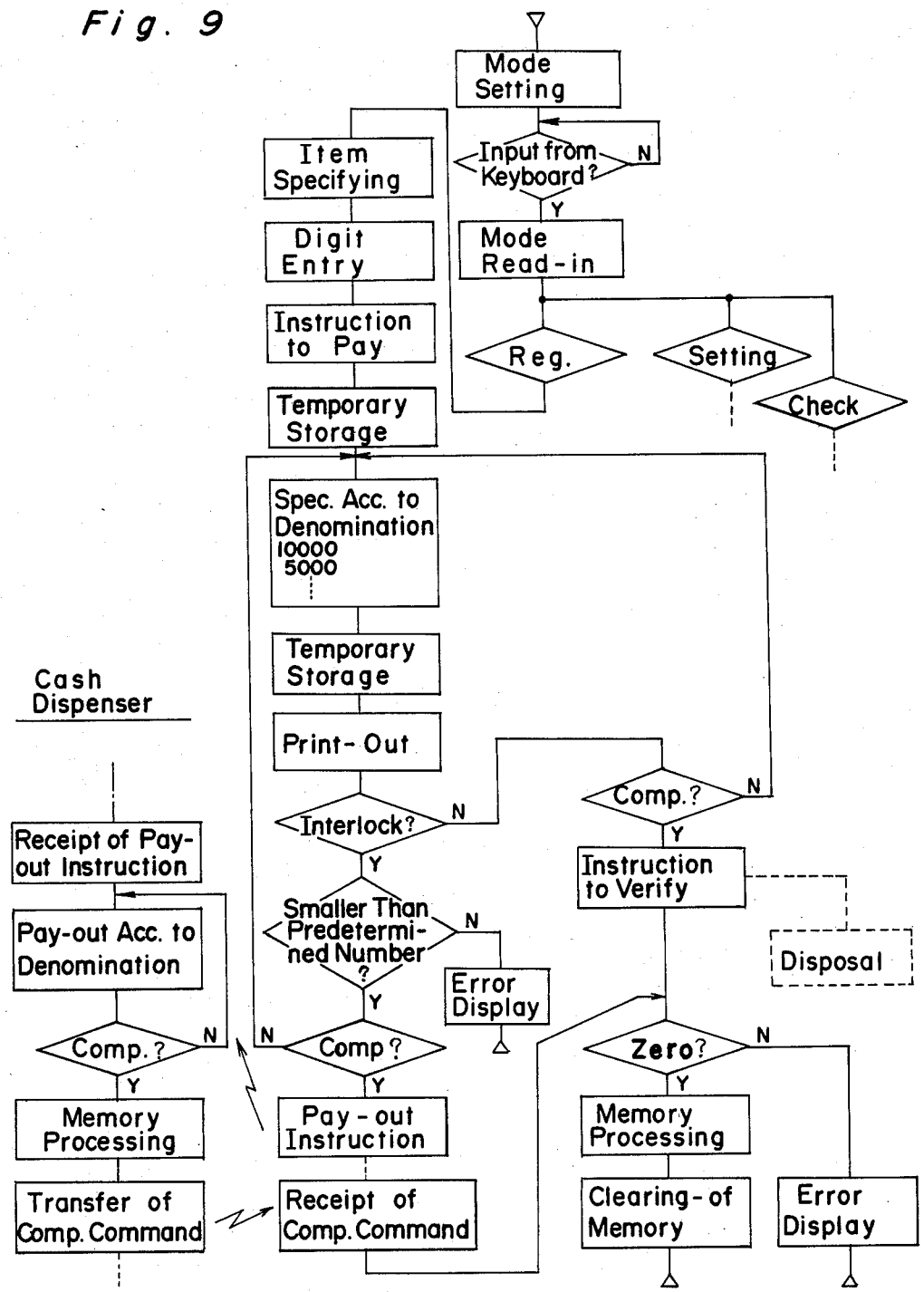
FIG. 9 is a flow chart showing a program of operation of the system of FIG. 8 under a registering mode.

The operation under the registering mode will now be described with reference to FIG. 9.

If the setting of the various information has been completed in the manner as hereinbefore described and a registration of transaction is brought about, the operator has to set the selector switch 1 to a registering mode, in a manner similar to the above described procedure, to cause registering mode information to be stored at the area a in the CPU 6. The CPU 6, upon receipt of the registering mode information, deals with the data to be subsequently entered as registering data, which data are thereafter processed according to a predetermined registering program stored in the ROM 7 as shown in FIG. 9.

More specificaly, by depressing one of the item specifying keys I to N in the function keyboard 4, information concerning which one of the ordinary deposit and the current deposit the particular transaction relates to is entered and the specification of the item is instructed to the CPU 6 through the discriminator 10.

Subsequently, the operator enters the total amount of money transacted into the CPU 6 from the numerical keyboard 3 through the encoder 9 and then depresses a pay instruction key or a deposit instruction key in the function keyboard 4 to indicate that the money information which has previously been fed to the CPU 6 through the discriminator 10 is concerned with the process to pay money or to deposit.

The CPU 6 upon receipt of this instruction, causes the amount of money to be paid to be stored at the predetermined area of the primary memory 15, specified by the primary address counter 14, through the primary input and output control 16.

Subsequently, in order to specify the amount of money to be paid out according to the different denomination, the operator manipulates the numerical keyboard 3 to feed the money information to the CPU 6 through the encoder 9 and also manipulates one of the denomination specifying keys t in the function keyboard 4 to instruct the CPU 6 through the discriminator 10 as to the amount of money according to the different denomination. The CPU 6 upon receipt of this instruction causes it to be stored at the predetermined area of the primary memory 15 specified by the primary address counter 14, through the primary input and output control 16. Simultaneously therewith, these data are printed out through the printer 17.

At this time, the CPU 6 makes reference to the area b to determine whether or not the cash dispenser II is interlocked with the cash register I and, if they are interlocked, to determine whether or not the amount of money can be paid in designated denominations as specified by the data of such amount and money of designated denomination, and further, if it has been found not payable, to provide a display to warn the operator that the amount of money cannot be payable in the designated denominations.

On the other hand, if it has been determined payable, and when the data of all of the denominations is supplied, the operator has to give a pay-out instruction to the CPU 6 by depressing a pay-out instructing key T in the function keyboard 4. In response to this instruction, the CPU gives a pay-out instruction together with the data of the amount of money of different denomination to the cash dispenser II through the data transfer control 19.

When the CPU 30 has received both of the pay-out instruction and the denomination data through the data transfer control 20 in the cash dispenser II, the CPU 30 controls the pay-out control unit 21 in accordance with the program stored in the ROM 34 and causes the drive unit 22 to activate the storage unit 23 to dispense the required amount of money onto the tray 25.

At this time, the required amount of money is counted by the pay-out counter 24, and after the payout completion detector 26 has confirmed the pay-out of the required amount of money in response to an output signal from the counter 24, a pay-out completion signal is supplied therefrom to the pay-out control unit 21. Thereafter, in response to the pay-out completion signal, the pay-out control unit 21 gives a pay-out completion signal to the CPU 30.

When the pay-out of the money of different denomination has completely been finished in the manner as hereinabove described, the CPU 30 subtracts the actually paid amount of money from the denomination data stored in the third memory 33. Subsequently, the CPU transfers a pay-out completion command to the cash register I through the data transfer control 20. The CPU 6, upon receipt of this command, determines whether or not the amount of money to be paid out which has previously been entered coincides with the amount of money actually paid out, and if they coincide with each other, causes both of the amount of money paid and the item information stored in the primary memory 15 to be transferred to and then stored in the secondary memory 12 while the contents in the primary memory 15 are cleared.

Thus, in the embodiment of the present invention now under discussion, the money data in the third memory 33 is updated where the cash dispenser is interlocked with the cash register.

The foregoing description applies where the cash dispenser II is interlocked with the cash register I. However, where it is not interlocked, the operator manipulates the verifying key A in the function keyboard 4 to give to the CPU 6 an instruction to verify so that a check can be made as to whether or not the amount of money to be paid out which has been previously entered coincides with the amount of money of different denomination.

In response to the instruction from the function keyboard 4, the CPU 6 performs the verifying operation and, if they are found coinciding, operates in such a manner as to cause the amount of money stored in the primary memory 15 to be subtracted from the amount of money stored in the primary memory 12 and as to cause the result of the subtraction to be again stored at denomination areas in the secondary memory 12 together with both of the amount of money paid and the item information.

At this time, the operator draws the above described entered amount of money out of a safe and hands it to a customer.

Thus, where the cash dispenser is not interlocked with the cash register, only the denomination data in the secondary memory 12 in the cash register I can be updated.

Hereinafter, the operation under a checking mode will now be described with particular reference to FIG. 11.

Where all of the transactions occurring in a day have been registered and the data so registered is desired to be checked, the operator has to move the mode selector switch 1 to a check mode position to allow the mode information to be stored at the area a of the CPU 6 in a manner similar to that described hereinbefore.

Figure 11:
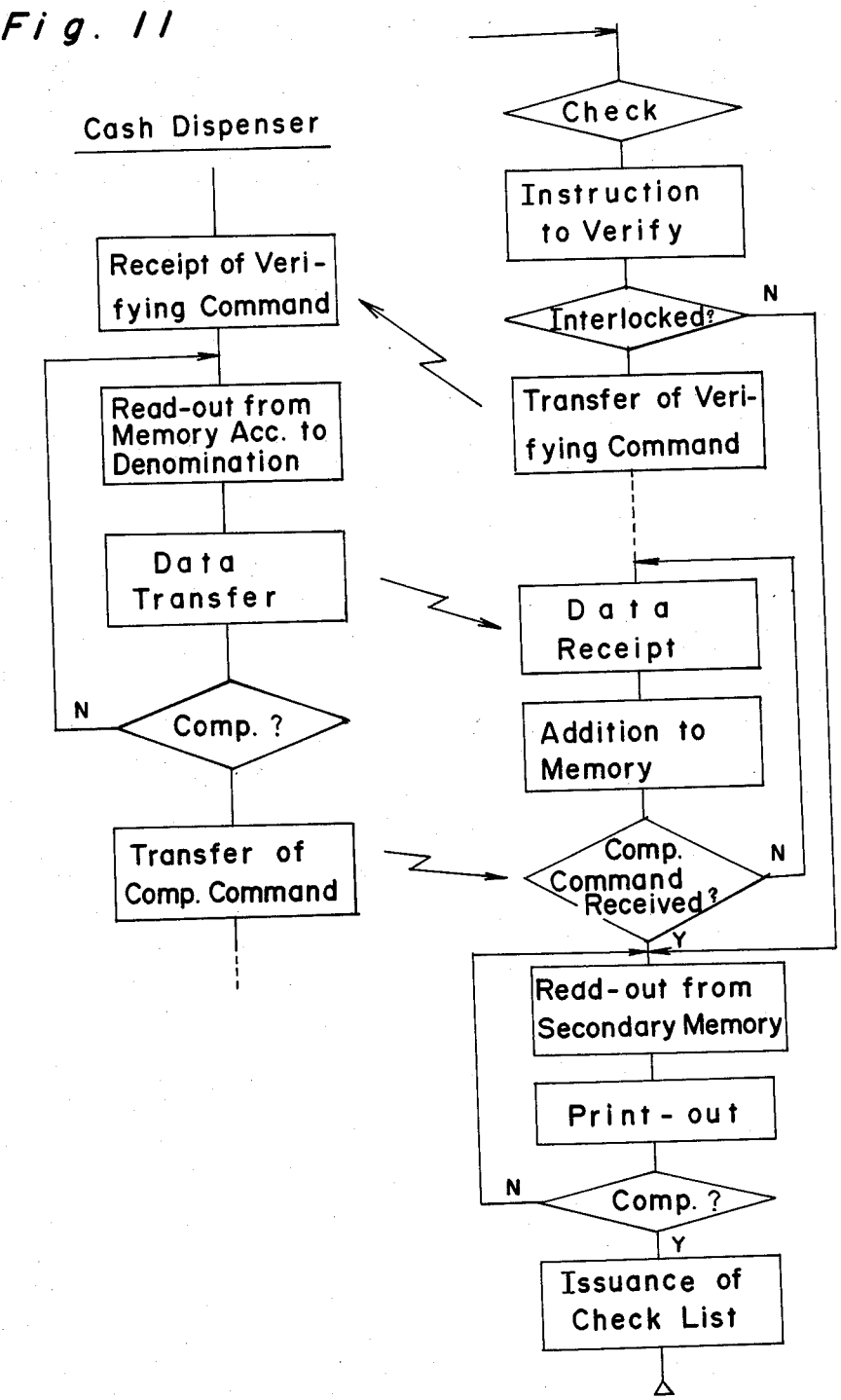
FIG. 11 is a flow chart showing a program of operation of the system of FIG. 8 under a checking mode.

When the operator subsequently depresses a check instruction key I in the function keyboard 4, the CPU 6 determines whether or not the flag has been set in the area b and, if it is found set, transfers a check command to the cash dispenser so that the data of different denomination stored in the third memory 33 in the cash dispenser can be read out to the cash register and then added to the data stored in the secondary memory 27 as shown in FIG. 11.

When the read-out of the data from the cash dispenser II has finished and the addition has also finished, the data stored in the secondary memory is read out and printed out from the printer unit 17 in the form of a check list as shown in FIG. 11.

On the other hand, if the cash dispenser is not interlocked with the cash register, only the data stored in the secondary memory 12 can be read out and printed out in the form of a check list.

As hereinbefore described, according to the present invention, where the cash register I and the cash dispenser II are interlocked with each other, a check list describing the current stock of money in the cash dispenser can be issued in association with the checking operation of the cash register I. Therefore, the current stock of money in the system as a whole can readily be confirmed.

Although the present invention has fully been described in connection with the preferred embodiments thereof with reference to the accompanying drawings, it is to be noted that various changes and modifications will be apparent to those skilled in the art. Such changes and modifications are to be understood as included within the scope of the present invention which is limited only by the appended claims.

We claim:

1. A cash accounting system for enabling an operator to input information and receive information regarding monetary transactions, comprising:

a plurality of cash register means each including input means for facilitating operator input of information regarding cash payout transactions;

first memory means associated with each said cash register means for storing first data including the total amount of money available for payout and the amounts of respective denominations of said money;

a sole cash dispenser means coupled to said plurality of cash register means and including means responsive to said input means of each said cash register means for dispensing sums of money for each payout transaction in amounts and denominations specified by an operator via said input means;

second memory means associated with said cash dispenser means for storing second data related to the amount of money and the amounts of respective denominations stored in and dispensed by said dispenser means;

said input means of each cash dispenser means comprising means for inputting and transferring to said second memory means said second data relating to amounts of money and denominations stored in said cash dispenser means;

data transfer means associated with said first and second memory means for correlating said first data related to payout transactions with said second data relating to money dispensed during said transactions including means for subtracting said first data relating to payout transactions, including the respective denomination amounts of money paid out, from the respective denomination amounts of money stored in the second memory means of said cash dispenser means;

said input means including checking means for prompting a checking operation for said system to verify that the amount of money and respective denominations requested for payout by said input means coincides with the amount of money and respective denominations actually paid out; and output means associated with said checking means and said first and second memory means for outputting information relating to transactions by said cash register means, said checking operation and money dispensed by said cash dispenser means.

* * * * *